US012584731B2

(12) United States Patent
Chen et al.

(10) Patent No.: US 12,584,731 B2
(45) Date of Patent: Mar. 24, 2026

(54) DIGITAL SPECKLE BASED ONLINE WATER WALL STRESS MONITORING METHOD AND DEVICE

(71) Applicants: Huaneng (Zhejiang) Energy Development Co., Ltd. Yuhuan Branch, Taizhou (CN); Huaneng (Zhejiang) Energy Development Co., Ltd., Hangzhou (CN)

(72) Inventors: Feng Chen, Taizhou (CN); Linfang Shao, Taizhou (CN); Zhenghua Shen, Taizhou (CN); Bin Jiang, Taizhou (CN); Laichun Li, Taizhou (CN); Wei Xiong, Taizhou (CN); Shenglin Pang, Taizhou (CN); Yin Huang, Taizhou (CN); Xiaoyan Li, Taizhou (CN); Peiqiang Bai, Taizhou (CN); Ming Zhao, Taizhou (CN); Jianjiang Chen, Taizhou (CN); Jianfei Zhang, Taizhou (CN); Peng Lei, Taizhou (CN); Chao Yu, Taizhou (CN); Yanhua Chen, Taizhou (CN)

(73) Assignees: Huaneng (Zhejiang) Energy Development Co., Ltd. Yuhuan Branch, Taizhou (CN); Huaneng (Zhejiang) Energy Development Co., Ltd., Hangzhou (CN)

( * ) Notice: Subject to any disclaimer, the term of this patent is extended or adjusted under 35 U.S.C. 154(b) by 398 days.

(21) Appl. No.: 18/344,809

(22) Filed: Jun. 29, 2023

(65) Prior Publication Data

US 2024/0035809 A1 Feb. 1, 2024

Related U.S. Application Data

(63) Continuation of application No. PCT/CN2022/130190, filed on Nov. 7, 2022.

(30) Foreign Application Priority Data

Jul. 27, 2022 (CN) .......................... 202210893975.6

(51) Int. Cl.
 *G01B 11/16* (2006.01)
 *G01B 11/25* (2006.01)
 *G01M 5/00* (2006.01)

(52) U.S. Cl.
 CPC .......... *G01B 11/162* (2013.01); *G01B 11/254* (2013.01); *G01M 5/0041* (2013.01); *G01M 5/0091* (2013.01)

(58) Field of Classification Search
 CPC .. G01B 11/162; G01B 11/254; G01M 5/0041; G01M 5/0091
 (Continued)

(56) References Cited

U.S. PATENT DOCUMENTS

2004/0057054 A1 3/2004 Toyooka et al.
2005/0146708 A1 7/2005 Shi et al.
 (Continued)

FOREIGN PATENT DOCUMENTS

CN 201795989 U * 4/2011
CN 203396356 U 1/2014
 (Continued)

OTHER PUBLICATIONS

Translation_CN110146029 (Year: 2019).*
 (Continued)

*Primary Examiner* — Peter J Macchiarolo
*Assistant Examiner* — Monica S Young

(57) ABSTRACT

A digital speckle based online water wall stress monitoring method and device, and the method includes the following steps: arrange an online stress monitoring device on the side of the water wall to be monitored; determine a plurality of
 (Continued)

monitoring points according to the area of the water wall, and set the motion track of the online stress monitoring device for speckle image acquisition according to the determined monitoring points; acquire the real-time speckle image of each monitoring point in real time after acquiring the initial speckle image of each monitoring point; compare the real-time speckle images with the initial speckle images, and determine whether the stress of the water wall changes according to the comparison results. The invention adopts non-contact digital image technology, and determines the difference between the real-time and initial speckle images of the water wall to realize the stress monitoring.

9 Claims, 4 Drawing Sheets

(58) Field of Classification Search
USPC ........................................................ 73/800
See application file for complete search history.

(56) References Cited

U.S. PATENT DOCUMENTS

| | | | |
|---|---|---|---|
| 2018/0178339 A1 | 6/2018 | Hwang et al. | |
| 2018/0220892 A1* | 8/2018 | Klubben, III .......... | A61B 1/044 |

| | | | | | |
|---|---|---|---|---|---|
| 2019/0094009 A1 | | 3/2019 | Aizawa et al. | | |
| 2019/0271537 A1 | | 9/2019 | Kontsos et al. | | |
| 2021/0348975 A1* | | 11/2021 | Yang ..................... | | G06T 1/0007 |

FOREIGN PATENT DOCUMENTS

| | | | | | |
|---|---|---|---|---|---|
| CN | 108955553 A | | 12/2018 | | |
| CN | 109000578 A | | 12/2018 | | |
| CN | 109030546 A | * | 12/2018 | ............ | G01B 11/16 |
| CN | 109163669 A | | 1/2019 | | |
| CN | 109931878 A | | 6/2019 | | |
| CN | 110146029 A | * | 8/2019 | ............ | G01B 11/16 |
| CN | 110823116 A | | 2/2020 | | |
| CN | 210147222 U | * | 3/2020 | | |
| CN | 115540775 A | * | 12/2022 | ............ | G01B 11/16 |

OTHER PUBLICATIONS

Translation_CN201795989 (Year: 2011).*
Translation_CN210147222 (Year: 2020).*
Translation_CN115540775 (Year: 2022).*
Translation_CN109030546 (Year: 2018).*
Zhang Yu et al. 'Application of Digital Image Correlation Technology in Stress-Strain Measurement of In-Service Water-Cooled Walls.' Welding Technology, vol. 49, No. 12, Dec. 31, 2020 (Dec. 31, 2020), pp. 83-88.

* cited by examiner

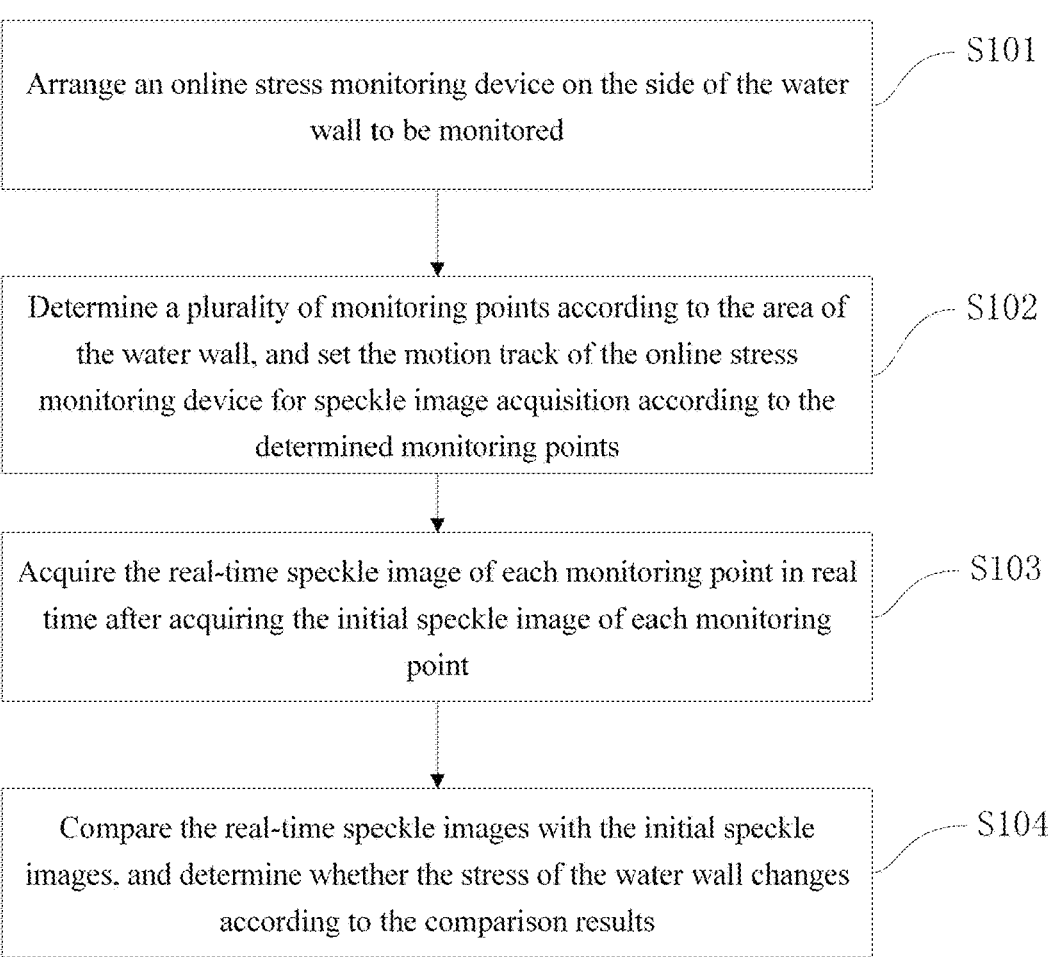

Arrange an online stress monitoring device on the side of the water wall to be monitored    S101

Determine a plurality of monitoring points according to the area of the water wall, and set the motion track of the online stress monitoring device for speckle image acquisition according to the determined monitoring points    S102

Acquire the real-time speckle image of each monitoring point in real time after acquiring the initial speckle image of each monitoring point    S103

Compare the real-time speckle images with the initial speckle images, and determine whether the stress of the water wall changes according to the comparison results    S104

FIG. 1

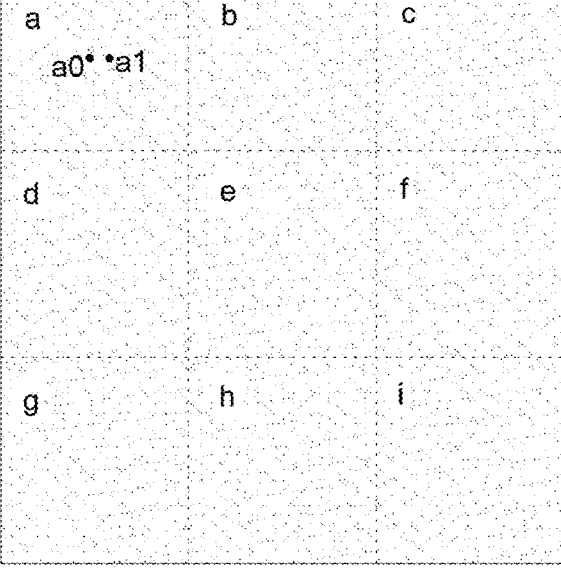

FIG. 2

DIGITAL SPECKLE BASED ONLINE WATER WALL STRESS MONITORING METHOD AND DEVICE

CROSS-REFERENCE TO RELATED APPLICATIONS

This application is a continuation of PCT/CN2022/130190, filed Nov. 7, 2022 and claims priority of Chinese Patent Application No. 202210893975.6, filed on Jul. 27, 2022, the entire contents of which are incorporated herein by reference.

TECHNICAL FIELD

The invention relates to the technical field of stress monitoring, in particular to a digital speckle based online water wall stress monitoring method and device.

BACKGROUND ART

At present, the digital image correlation technology is a method for obtaining the full-field displacement by computer processing of specimen images in undeformed and deformed states. The binocular stereo vision technology is used to measure the three-dimensional coordinates, displacement and strain of the object surface in the deformation process by tracking the speckle image of the object surface. The technology is mainly applied to the measurement and acquisition of full-field strain, deformation, displacement, amplitude, mode and other information.

With the rapid development of national industry and economy, China has a larger and larger demand for energy, and the improvement of energy efficiency is an effective solution to the shortage of energy. Thermal power generation is the main way of power generation in China. As one of the three host equipment in the thermal power station, the power station boiler develops with the development of thermal power industry in China. The water wall is the main heated part of the boiler, which is composed of several rows of steel tubes and distributed around the boiler furnace. Water or steam flow inside the water wall, and the exterior of the water wall receives heat from the flame of the boiler furnace. The water wall mainly absorbs the radiation heat of high temperature combustion products in the furnace, and the working medium moves upward in the water wall and evaporates under heat. The function of the water wall is to absorb the radiation heat of the high temperature flame or flue gas in the furnace, generate steam or hot water in the tubes, and reduce the temperature of the furnace wall to protect the furnace wall.

In the working process of the boiler, the steel tubes are easily affected by the temperature to cause thermal expansion and cold contraction, resulting in deformation of the steel tubes. Once failure of the steel tubes occurs, serious property losses and casualties will be caused. Therefore, the real-time water wall monitoring of a suitable online stress monitoring device can reduce the accident loss and even prevent the accident, which is of great significance to ensure the life and property safety.

At present, the methods of online water wall stress monitoring are limited due to the limitation of site environmental factors. Therefore, how to improve the safety of monitoring process and the reliability of monitoring device becomes an urgent problem to be solved.

CONTENT OF INVENTION

In view of this, the invention provides a digital speckle based online water wall stress monitoring method and device, aiming to solve the problem of how to improve the reliability and safety during the online stress monitoring of the water wall.

On one hand, the invention provides a digital speckle based online water wall stress monitoring method, including the following steps:

Arrange an online stress monitoring device on the side of the water wall to be monitored;

Determine a plurality of monitoring points according to the area of the water wall, and set the motion track of the online stress monitoring device for speckle image acquisition according to the determined monitoring points;

Acquire the real-time speckle image of each monitoring point in real time after acquiring the initial speckle image of each monitoring point;

Compare the real-time speckle images with the initial speckle images, and determine whether the stress of the water wall changes according to the comparison results.

Further, the digital speckle based online water wall stress monitoring method includes the following steps when acquiring the initial speckle image of each monitoring point:

Debug a blue light of the online stress monitoring device until the blue light projects clear speckles on the wall surface of the water wall to be monitored;

Acquire the speckle image of each monitoring point according to the set shooting parameters.

Further, the digital speckle based online water wall stress monitoring method includes the following steps when determining a plurality of monitoring points according to the area of the water wall and setting the motion track of the online stress monitoring device for speckle image acquisition according to the determined monitoring points:

Determine the surface area $S0$ of the water wall;

Preset the first preset area $S1$, the second preset area $S2$, the third preset area $S3$ and the fourth preset area $S4$, and $S1<S2<S3<S4$; preset the number $Q1$ of first preset monitoring points, the number $Q2$ of second preset monitoring points, the number $Q3$ of third preset monitoring points and the number $Q4$ of fourth preset monitoring point, and $Q1<Q2<Q3<Q4$;

Set the number of monitoring points according to the relationship between the surface area $S0$ and each preset area:

When $S0<S1$, select the number $Q1$ of first preset monitoring points as the number of monitoring points;

When $S1\leq S0<S2$, select the number $Q2$ of first preset monitoring points as the number of monitoring points;

When $S2\leq S0<S3$, select the number $Q3$ of first preset monitoring points as the number of monitoring points;

When $S3\leq S0<S4$, select the number $Q4$ of first preset monitoring points as the number of monitoring points;

After selecting the number $Qi$ of preset monitoring points $i$ as the number of monitoring points, and $i=1,2,3,4$, connect $Qi$ monitoring points in series as the motion track of the online stress monitoring device in order to enable the online stress monitoring device to acquire the speckle images of each monitoring point in the motion track in turn.

Further, the digital speckle based online water wall stress monitoring method includes the following steps when comparing the real-time speckle images with the initial speckle images and determining whether the stress of the water wall changes according to the comparison results:

Acquire the initial speckle images of $Qi$ monitoring points respectively, and mark a plurality of initial feature points in the initial speckle images of each monitoring point;

Acquire the real-time speckle images of Qi monitoring points respectively, and mark a plurality of initial feature points in the real-time speckle images of each monitoring point;

Compare the real-time feature points with the initial feature points, and determine whether the stress of the water wall changes according to the displacement between the real-time feature points and the initial feature points.

Further, the digital speckle based online water wall stress monitoring method includes the following steps when comparing the real-time feature points with the initial feature points and determining whether the stress of the water wall changes according to the displacement between the real-time feature points and the initial feature points;

Preset the first preset displacement K1, the second preset displacement K2, the third preset displacement K3 and the fourth preset displacement K4, and K1<K2<K3<K4; preset the first preset interval time T1, the second preset interval time T2, the third preset interval time T3 and the fourth preset interval time T4, and T1>T2>T3>T4;

Acquire the displacement between the real-time feature points and the initial feature points collected each time, determine the monitoring point with the maximum displacement among the monitoring points, and denote the displacement of the monitoring point as the maximum displacement K0;

Determine the interval time for acquiring two adjacent real-time speckle images of each monitoring point according to the relationship between the maximum displacement K0 and each preset displacement:

When K0<K1, select the first preset interval time T1 as the interval time for acquiring two adjacent real-time speckle images of each monitoring point;

When K1≤K0<K2, select the second preset interval time T2 as the interval time for acquiring two adjacent real-time speckle images of each monitoring point;

When K2≤K0<K3, select the third preset interval time T3 as the interval time for acquiring two adjacent real-time speckle images of each monitoring point;

When K3≤K0<K4, select the fourth preset interval time T4 as the interval time for acquiring two adjacent real-time speckle images of each monitoring point;

After selecting the ith preset interval time Ti as the interval time for acquiring two adjacent real-time speckle images of each monitoring point, and i=1,2,3,4, acquire the real-time speckle images of the monitoring points every ith preset interval time Ti.

Further, the digital speckle based online water wall stress monitoring method includes the following steps when selecting the ith preset interval time Ti as the interval time for acquiring two adjacent real-time speckle images of each monitoring point:

Obtain the initial average gray value L0 of the initial speckle image and the real-time average gray value ΔL of the real-time speckle image of the monitoring point with the maximum displacement acquired each time;

Preset the first preset gray difference L1, the second preset gray difference L2, the third preset gray difference L3 and the fourth preset gray difference L4, and L1<L2<L3<L4; preset the first preset duration correction coefficient a1, the second preset duration correction coefficient a2, the third preset duration correction coefficient a3 and the fourth preset duration correction coefficient a4, and 1>a1>a2>a3>a4>0.8;

Correct the interval time for acquiring the two adjacent real-time speckle images according to the relationship between the difference between the real-time average gray value ΔL obtained each time and the initial average gray value L0 and the preset gray difference:

When $|\Delta L - L0| < L1$, select the first preset duration correction coefficient a1 to correct the interval time for acquiring two adjacent real-time speckle images, and the corrected interval time is Ti*a1;

When $L1 \le |\Delta L - L0| < L2$, select the second preset duration correction coefficient a2 to correct the interval time for acquiring two adjacent real-time speckle images, and the corrected interval time is Ti*a2;

When $L2 \le |\Delta L - L0| < L3$, select the third preset duration correction coefficient a3 to correct the interval time for acquiring two adjacent real-time speckle images, and the corrected interval time is Ti*a3;

When $L3 \le |\Delta L - L0| < L4$, select the fourth preset duration correction coefficient a4 to correct the interval time for acquiring two adjacent real-time speckle images, and the corrected interval time is Ti*a4.

On the other hand, the invention also provides a digital speckle based online water wall stress monitoring device, which is used to implement the digital speckle based online water wall stress monitoring method, comprising:

A stress monitoring unit, which is arranged on the side of the water wall and is used to acquire the speckle images of the water wall;

An image processing unit, which is electrically connected with the stress monitoring unit and is used for processing the speckle images;

A data terminal, which is electrically connected with the stress monitoring unit and the image processing unit and is used for data processing and controlling the motion track of the stress monitoring unit.

Further, the stress monitoring unit comprises:

A fixed frame;

A load bearing frame arranged inside the fixed frame, connected with the fixed frame in a sliding way and sliding along the fixed frame direction;

A movable speckle transceiver platform fixed inside the load bearing frame and used for acquiring the speckle images of the water wall;

A traction motor arranged on the upper part of the fixed frame, connected with the load bearing frame and used for driving the load bearing frame to move inside the fixed frame.

Further, the stress monitoring unit also comprises:

A counterweight device arranged on the side of the fixed frame in a sliding way;

A guide wheel arranged on the upper part of the fixed frame and side by side with the traction motor;

A steel wire rope, which is arranged on a guide wheel and connected with the traction motor, and two ends of which are respectively connected with the counterweight device and the load bearing frame.

Further, the movable speckle transceiver platform comprises a ball screw, a guide rail, a digital camera, a blue light, a deadweight sliding block and a motor, wherein The deadweight sliding block, the motor and the ball screw are installed on the guide rail, the motor is connected with the ball screw to drive the ball screw to make rotational motion and therefore drive a nut fixed in the deadweight sliding block to make linear to-and-fro movement, and the digital camera and the blue light are arranged on the deadweight sliding block.

Compared with the prior art, the invention has the following beneficial effects:

The invention realizes stress monitoring through an online stress monitoring device, overcomes the problem that the digital image related technical equipment is limited to a certain fixed position, improves the application flexibility of digital image related technology, and expands the application scenarios of digital image related technology.

The invention adopts the non-contact digital image technology to conduct the online water wall stress monitoring, and realizes the stress monitoring of the water wall by judging the difference between the real-time and initial speckle images of the water wall, thus improving the monitoring reliability and the safety in the monitoring process.

The online stress monitoring device of the invention adopts the digital image technology to conduct the stress monitoring, is easy to carry and convenient to operate, has high monitoring accuracy, and can effectively improve the online stress monitoring efficiency of the water wall.

DESCRIPTION OF DRAWINGS

By reading the detailed description of the preferred embodiments below, other advantages and benefits will become clear to the ordinary technicians in the field. The drawings are intended only for the purpose of showing the preferred embodiments and are not considered to be a limitation to the invention. Moreover, the same parts are represented by the same reference symbols throughout the drawings. In the drawings:

FIG. 1 is the flow chart of the digital speckle based online water wall stress monitoring method in the embodiments of the invention;

FIG. 2 is the partition diagram for the water wall in the embodiments of the invention;

Figures 3, 4:
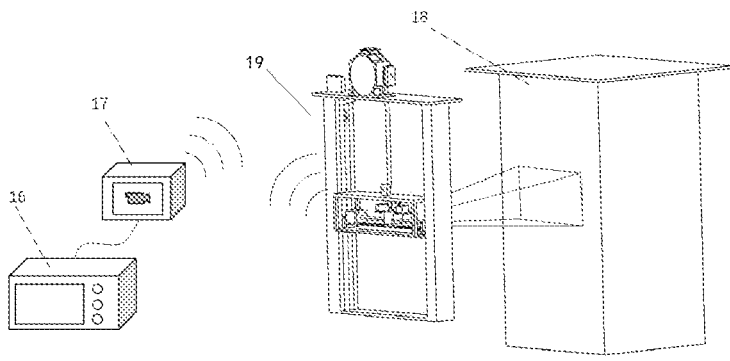
FIG. 3 is the structural diagram of the digital speckle based online water wall stress monitoring method in the embodiments of the invention.
FIG. 4 is the structural diagram of the stress monitoring unit in the embodiments of the invention.
Figure 5:
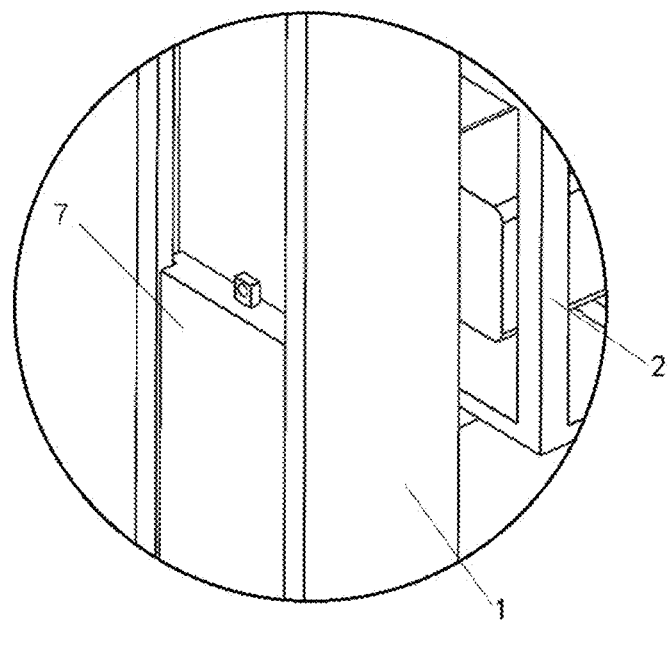
FIG. 5 is the local structural diagram of the stress monitoring unit in the embodiments of the invention.
Figure 6:
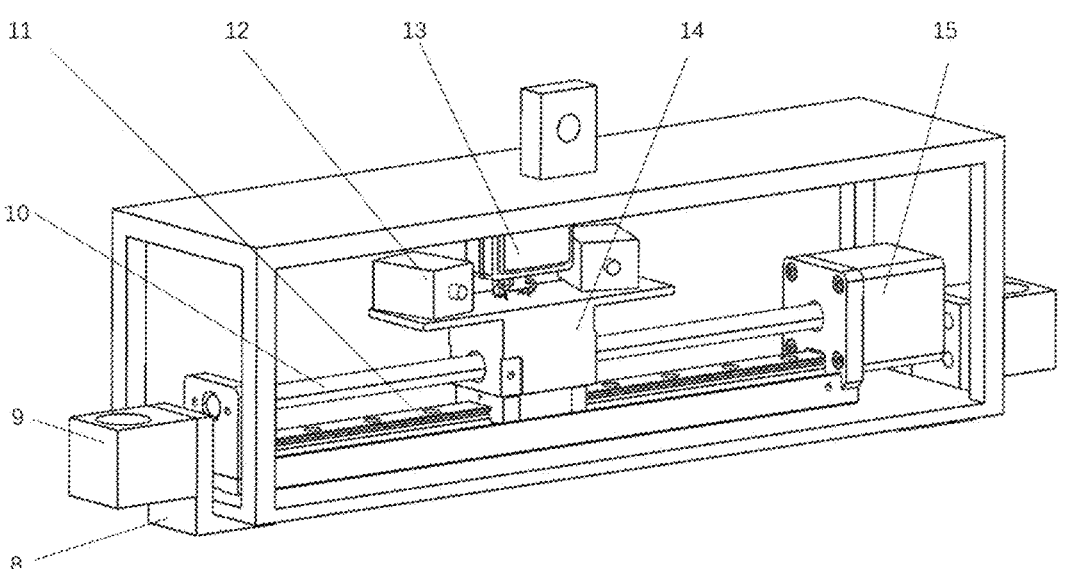
FIG. 6 is the structural diagram of the movable speckle transceiver platform in the embodiments of the invention.

In the drawings: 1—Fixed frame; 2—Load bearing frame; 3—Movable speckle transceiver platform; 4—Traction motor; 5—Steel wire rope; 6—Guide wheel; 7—Counterweight device; 8—Supporting plate; 9—Sliding block; 10—Ball screw; 11—Guide rail; 12—Digital camera; 13—Blue light; 14—Deadweight sliding block; 15—Motor; 16—Computer terminal; 17—Image processing module; 18—Water wall; 19—Stress monitoring unit.

EMBODIMENTS

The exemplary embodiments of the disclosure are described in more detail below with reference to the drawings. Although the exemplary embodiments of the disclosure are shown in the drawings, it should be understood that the disclosure may be implemented in various forms and should not be limited by the embodiments set forth herein. On the contrary, these embodiments are provided to enable a more thorough understanding of the disclosure and a complete communication of the scope of the disclosure to the technicians in the field. It should be noted that the embodiments and the features in the embodiments of the invention can be combined with each other without conflict. The invention is described in detail below with reference to the drawings and in conjunction with the embodiments.

As shown in FIG. 1, the embodiment provides a digital speckle based online water wall stress monitoring method, including the following steps:

Step S101: arrange an online stress monitoring device on the side of the water wall to be monitored;

Step S102: determine a plurality of monitoring points according to the area of the water wall, and set the motion track of the online stress monitoring device for speckle image acquisition according to the determined monitoring points;

Step S103: acquire the real-time speckle image of each monitoring point in real time after acquiring the initial speckle image of each monitoring point;

Step S104: compare the real-time speckle images with the initial speckle images, and determine whether the stress of the water wall changes according to the comparison results.

Specifically, the digital speckle based online water wall stress monitoring method includes the following steps when acquiring the initial speckle image of each monitoring point:

Debug a blue light of the online stress monitoring device until the blue light projects clear speckles on the wall surface of the water wall to be monitored;

Acquire the speckle image of each monitoring point according to the set shooting parameters.

Specifically, when the above embodiments are implemented, first select the water wall to be monitored on line for stress; fix the online stress monitoring device on the plane floor 10-20 m away from the water wall to ensure that the online stress monitoring device is perpendicular to the ground; determine that the speckles are at the initial generation position of the water wall, start monitoring, and then the monitoring area changes with the movement of the online stress monitoring device to realize the stress monitoring of the water wall. The acquired monitoring images are sent to the image processing module for processing, and then the monitoring results are sent to the computer terminal.

It can be seen that the embodiment realizes stress monitoring through the online stress monitoring device, overcomes the problem that the digital image related technical equipment is limited to a certain fixed position, improves the application flexibility of digital image related technology, and expands the application scenarios of digital image related technology.

Specifically, after determining that the speckles are at the initial generation position of the water wall, adjust the blue light until a clear speckle is projected on the surface of the monitored water wall. Shoot the corresponding speckle image at the initial monitoring position according to the set shooting parameters. Set the motion track of the monitoring device according to the area of the monitored water wall. When the monitoring device moves along the motion track for the first time, shoot the initial speckle image of the position at the corresponding position. After shooting the initial speckle images of all positions, continue moving according to the set motion track. When moving to the corresponding monitoring point, shoot the real-time speckle image at the monitoring point.

Meanwhile, the invention adopts the non-contact digital image technology to conduct the online water wall stress monitoring, and realizes the stress monitoring of the water wall by judging the difference between the real-time and initial speckle images of the water wall, thus improving the monitoring reliability and the safety in the monitoring process.

Specifically, the digital speckle based online water wall stress monitoring method includes the following steps when determining a plurality of monitoring points according to the area of the water wall and setting the motion track of the online stress monitoring device for speckle image acquisition according to the determined monitoring points:

Determine the surface area S0 of the water wall;

Preset the first preset area S1, the second preset area S2, the third preset area S3 and the fourth preset area S4, and S1<S2<S3<S4; preset the number Q1 of first preset monitoring points, the number Q2 of second preset monitoring points, the number Q3 of third preset monitoring points and the number Q4 of fourth preset monitoring point, and Q1<Q2 <Q3<Q4;

Set the number of monitoring points according to the relationship between the surface area S0 and each preset area:

When S0<S1, select the number Q1 of first preset monitoring points as the number of monitoring points;

When S1≤S0<S2, select the number Q2 of first preset monitoring points as the number of monitoring points;

When S2≤S0<S3, select the number Q3 of first preset monitoring points as the number of monitoring points;

When S3≤S0<S4, select the number Q4 of first preset monitoring points as the number of monitoring points;

After selecting the number Qi of preset monitoring points i as the number of monitoring points, and i=1,2,3,4, connect Qi monitoring points in series as the motion track of the online stress monitoring device in order to enable the online stress monitoring device to acquire the speckle images of each monitoring point in the motion track in turn.

As shown in FIG. 2, specifically, when a plurality of monitoring points are determined according to the area of the water wall, the surface of the water wall can be equally divided into 9 areas according to the size of the wall surface, namely areas a, b, c, d, e, f, g, h and i, which are respectively taken as monitoring points, that is, the speckle image data of the areas a, b, c, d, e, f, g, h and i are respectively collected.

Specifically, when setting the motion track of the online stress monitoring device for speckle image acquisition according to the determined monitoring points, determine the motion track according to the position of each monitoring point. For example, when determining the nine areas a-i as monitoring points, select one area from the nine areas a-I as the starting point, and acquire from other areas and connect the areas successively in series as the motion track. For example, take the area a as the starting point, and the set motion track is A-B-C-D-E-F-G-H-I.

Specifically, the digital speckle based online water wall stress monitoring method includes the following steps when comparing the real-time speckle images with the initial speckle images and determining whether the stress of the water wall changes according to the comparison results:

Acquire the initial speckle images of Qi monitoring points respectively, and mark a plurality of initial feature points in the initial speckle images of each monitoring point;

Acquire the real-time speckle images of Qi monitoring points respectively, and mark a plurality of initial feature points in the real-time speckle images of each monitoring point;

Compare the real-time feature points with the initial feature points, and determine whether the stress of the water wall changes according to the displacement between the real-time feature points and the initial feature points.

As shown in FIG. 2, specifically, when determining the initial feature points, take the area a as an example, and extract a plurality of feature points from the speckle image in area a after acquiring the initial speckle image. Here, take one point as an example and extract the feature point a0, which is used as the initial feature point. Similarly, determine the real-time feature point a1 in the real-time speckle image.

In determining the displacement between the real-time feature point and the initial feature point, only calculate the distance between the points a0 and a1 to obtain the displacement of point a0 relative to point a1, obtain a certain distance from the displacement of point a0 to point a1, that is, the displacement is the distance from point a0 to point a1.

Specifically, the digital speckle based online water wall stress monitoring method includes the following steps when comparing the real-time feature points with the initial feature points and determining whether the stress of the water wall changes according to the displacement between the real-time feature points and the initial feature points:

Preset the first preset displacement K1, the second preset displacement K2, the third preset displacement K3 and the fourth preset displacement K4, and K1<K2<K3<K4; preset the first preset interval time T 1, the second preset interval time T2, the third preset interval time T3 and the fourth preset interval time T4, and T1>T2>T3>T4;

Acquire the displacement between the real-time feature points and the initial feature points collected each time, determine the monitoring point with the maximum displacement among the monitoring points, and denote the displacement of the monitoring point as the maximum displacement K0. Specifically, select the maximum displacement of the real-time feature point as the maximum displacement K0 in each monitoring point after comparing the displacement between the real-time feature point and the initial feature point.

Specifically, the digital speckle based online water wall stress monitoring method includes the following steps when determining the interval time for acquiring two adjacent real-time speckle images of each monitoring point according to the relationship between the maximum displacement K0 and each preset displacement:

When K0<K1, select the first preset interval time T1 as the interval time for acquiring two adjacent real-time speckle images of each monitoring point;

When K1≤K0<K2, select the second preset interval time T2 as the interval time for acquiring two adjacent real-time speckle images of each monitoring point;

When K2≤K0<K3, select the third preset interval time T3 as the interval time for acquiring two adjacent real-time speckle images of each monitoring point;

When K3≤K0<K4, select the fourth preset interval time T4 as the interval time for acquiring two adjacent real-time speckle images of each monitoring point;

After selecting the ith preset interval time Ti as the interval time for acquiring two adjacent real-time speckle images of each monitoring point, and i=1,2,3,4, acquire the real-time speckle images of the monitoring points every ith preset interval time Ti.

It can be seen that the time interval for acquiring the real-time speckle images can be effectively adjusted in real time according to the stress change of the water wall by determining the interval time for acquiring two adjacent real-time speckle images of each monitoring point according to the relationship between the maximum displacement K0 and each preset displacement, thereby improving the monitoring efficiency and adjusting the monitoring time interval in time according to the stress change of the water wall.

Specifically, the digital speckle based online water wall stress monitoring method includes the following steps when selecting the ith preset interval time Ti as the interval time for acquiring two adjacent real-time speckle images of each monitoring point:

Obtain the initial average gray value L0 of the initial speckle image and the real-time average gray value ΔL of the real-time speckle image of the monitoring point with the maximum displacement acquired each time;

Preset the first preset gray difference L1, the second preset gray difference L2, the third preset gray difference L3 and the fourth preset gray difference L4, and L1<L2<L3<L4; preset the first preset duration correction coefficient a1, the second preset duration correction coefficient a2, the third preset duration correction coefficient a3 and the fourth preset duration correction coefficient a4, and 1>a1>a2>a3>a4>0.8;

Correct the interval time for acquiring the two adjacent real-time speckle images according to the relationship between the difference between the real-time average gray value ΔL obtained each time and the initial average gray value L0 and the preset gray difference:

When |ΔL−L0|<L1, select the first preset duration correction coefficient a1 to correct the interval time for acquiring two adjacent real-time speckle images, and the corrected interval time is Ti*a1;

When L1≤|ΔL−L0|<L2, select the second preset duration correction coefficient a2 to correct the interval time for acquiring two adjacent real-time speckle images, and the corrected interval time is Ti*a2;

When L2≤|ΔL−L0|<L3, select the third preset duration correction coefficient a3 to correct the interval time for acquiring two adjacent real-time speckle images, and the corrected interval time is Ti*a3;

When L3≤|ΔL−L0|<L4, select the fourth preset duration correction coefficient a4 to correct the interval time for acquiring two adjacent real-time speckle images, and the corrected interval time is Ti*a4.

The above embodiment overcomes the problem that the digital image related technical equipment is limited to a certain fixed position through the online stress monitoring device, improves the application flexibility of digital image related technology, and expands the application scenarios of digital image related technology.

The above embodiment adopts the non-contact digital image technology to conduct the online water wall stress monitoring, and realizes the stress monitoring of the water wall by judging the difference between the real-time and initial speckle images of the water wall surface through the image algorithm, thus improving the monitoring reliability and the safety in the monitoring process.

As shown in FIG. 3 to FIG. 6, another preferred embodiment based on the above embodiment provides a digital speckle based online water wall stress monitoring device, which is used to implement the digital speckle based online water wall stress monitoring device in the above embodiment, comprising:

A stress monitoring unit 19, which is arranged on the side of the water wall 18 and is used to acquire the speckle images of the water wall 18;

An image processing unit 17, which is electrically connected with the stress monitoring unit 19 and is used for processing the speckle images;

A data terminal 16, which is electrically connected with the stress monitoring unit 19 and the image processing unit 17 and is used for data processing and controlling the motion track of the stress monitoring unit 19.

Specifically, the stress monitoring unit 19 comprises a fixed frame 1, a load bearing frame 2, a movable speckle transceiver platform 3 and a traction motor 4. The load bearing frame 2 is arranged in the fixed frame 1, is connected with the fixed frame 1 in a sliding way and slides along the direction of the fixed frame 1; the movable speckle transceiver platform 3 is fixed in the load bearing frame 2 and is used to acquire the speckle images of the water wall 18; the traction motor 4 is arranged on the upper part of the fixed frame 1, is connected with the load bearing frame 2, and is used to drive the load bearing frame 2 to move inside the fixed frame 1.

Specifically, the stress monitoring unit 19 also comprises a counterweight device 7, a guide wheel 6 and a steel wire rope, wherein the counterweight device 7 is arranged on the side of the fixed frame 1 in a sliding way; the guide wheel 6 is arranged on the upper part of the fixed frame 1 and side by side with the traction motor 4; the steel wire rope is arranged on the guide wheel 6 and connected with the traction motor 4, and the two ends of the steel wire rope are respectively connected with the counterweight device 7 and the load bearing frame 2.

Specifically, in the implementation, the fixed frame 1 is installed vertically on the inside of the plane floor, and the traction motor 4 is installed on the outside of the floor. The movable speckle transceiver platform is fixed on the load bearing frame 2, the load bearing frame 2 is fixed at one end of the steel wire rope, and the other end of the steel wire rope is fixed on the counterweight device 7 on the side of the fixed frame 1 and bypasses the traction motor 4 and the guide wheel 6. The friction between the wire rope and the traction motor 4 generates traction force to drive the load bearing frame 2 to move up and down, so that the movable speckle transceiver platform 3 moves in the vertical direction. The movable speckle transceiver platform 3 is equipped with a lead screw drive mechanism, which can move in the horizontal direction.

Specifically, the movement speed of the movable speckle transceiver platform 3 is 0.1 m/s in the vertical direction.

Specifically, the weight of the counterweight device 7 and the weight of the movable speckle transceiver platform are required to meet the conditions of traction drive.

Specifically, the traction motor 4 is a small AC geared traction motor, which ensures that the movable speckle transceiver platform 3 can move in the vertical direction at 2-5 m/s. The base and installation plane of the traction motor 4 must be inspected for whether there is a gap using a feeler before tightening the bolts. If there is a gap, pack with a gasket to prevent any form of gap from affecting the operation function of the traction motor 4.

Specifically, the length of the fixed frame 1 depends on the length of the monitored water wall, and the width depends on the lead screw drive distance of the movable speckle transceiver platform 3. If the width of the water wall is more than the lead screw drive distance, multiple online water wall stress monitoring devices are selected to be installed in parallel, and the distance between the adjacent fixed frame 1 should be more than 2 cm.

Specifically, the movable speckle transceiver platform 3 comprises a ball screw 10, a guide rail 11, a digital camera 12, a blue light 13, a deadweight sliding block 14 and a motor 15, wherein The deadweight sliding block 14, the motor 15 and the ball screw 10 are installed on the guide rail 11, the motor 15 is connected with the ball screw to drive the ball screw 10 to make rotational motion and therefore drive a nut fixed in the deadweight sliding block 14 to make linear to-and-fro movement, and the digital camera 12 and the blue light 13 are arranged on the deadweight sliding block 14.

Specifically, the movable speckle transceiver platform 3 is composed of a ball screw 10, a guide rail 11, digital cameras 12, a blue light 13, a deadweight sliding block 14 and a motor 15. The deadweight sliding block 14, the motor 15 and the ball screw 10 are installed on guide rail 11, driven by the motor 15, the lead screw makes rotational motion drive a nut fixed in the deadweight sliding block 14 to make a linear to-and-fro movement. The blue light 13 and two digital cameras 12 are mounted on the deadweight sliding block 14, and the digital cameras 12 are mounted symmetrically on both sides of the blue light 13.

Specifically, to avoid interference during horizontal displacement, the height difference s between the deadweight sliding block 14 and the stepper motor should be more than 10 mm.

Specifically, the motor 15 used in the movable speckle transceiver platform 3 is a stepper motor to meet the accuracy requirements for platform movement in the horizontal direction. The ball screw drive distance should be less than 3 m, and the diameter to length ratio of the ball screw 10 should be less than 60.

Specifically, both ends of the movable speckle transceiver platform 3 are fixed by a supporting and a sliding block 9, the sliding block 9 is mounted on a cylindrical guide rail 11 on the inner side of the fixed frame 1 to enable the movable speckle transceiver platform 3 to move steadily in the vertical direction.

Specifically, the resolution accuracy of the two digital cameras 12 is and the mounting angle of the two digital cameras 12 is 30-45 degrees.

Specifically, metal with higher stiffness is selected as the material for the supporting 8 and the deadweight sliding block 14, generally C45 steel.

Specifically, the data terminal 16 is preferably a computer terminal, the image processing unit 17 is an image processing module, and the data terminal 16 and the image processing unit 17 respectively control the motion track of the stress monitoring unit 19 and process the speckle images transmitted by the movable speckle transceiver platform 3 of the stress monitoring unit 19 through wireless communication. Monitoring is started when determining the speckle emitted by the stress monitoring unit 19 is at the initial generation position of the water wall 18, and the stress monitoring unit 19 moves along the motion track set by the computer terminal.

Figure 7:
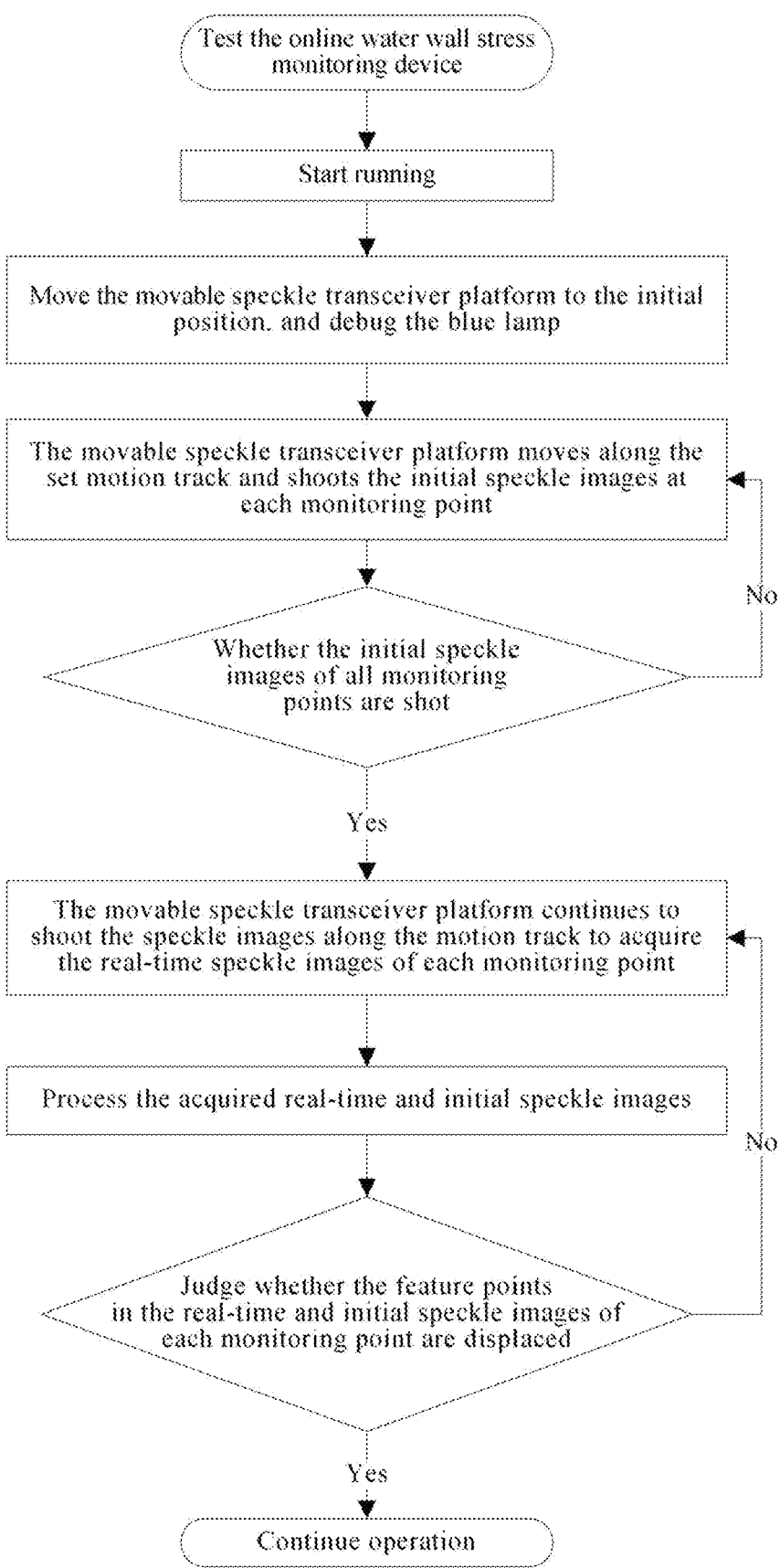
FIG. 7 is the working flow chart of the digital speckle based online water wall stress monitoring device in the embodiments of the invention.

As shown in FIG. 7, in the implementation of the above embodiment, the online water wall stress monitoring device is tested before the stress monitoring is started, and the online water wall stress monitoring device is put into operation after passing the test. After the operation starts, move the movable speckle transceiver platform to the initial position, that is, move the movable speckle transceiver platform to the initial monitoring point, and debug the blue lamp until clear speckles are projected on the wall of the monitored water wall. The movable speckle transceiver platform moves along the set motion track and shoots the initial speckle images at each monitoring point. After shooting the initial speckle images of all monitoring points, enable the movable speckle transceiver platform to shoot the speckle images along the motion track to acquire the real-time speckle images of each monitoring point, and then compare the acquired real-time speckle images with the initial speckle images after image processing, judge whether the real-time speckle images of all monitoring points and the feature points in the initial speckle images are displaced, mark the monitoring point and continue the follow-up monitoring if displacement occurs, and enable the movable speckle transceiver platform to continue moving along the set motion track.

Specifically, the stress monitoring method of the above embodiment is to determine whether the feature points in the real-time speckle images are different from the initial state of the feature points in the initial speckle images after the speckle images are shot by the online water wall stress monitoring device and the initial speckle images are calculated and compared by the image algorithm, thereby calculating the stress change of the water wall.

The invention has the following beneficial effects:

1) The invention overcomes the problem that the digital image related technical equipment is limited to a certain fixed position through an online stress monitoring device, improves the application flexibility of digital image related technology, and expands the application scenarios of digital image related technology.

2) Compared with the existing water wall monitoring technology through the digital image related technology, the invention realizes the stress monitoring of the water wall by judging the difference between the real-time and initial speckle images of the water wall surface through the image algorithm, thus having the advantages of high monitoring accuracy and improved real-time monitoring.

3) By applying the digital image related technology in the field of water wall stress monitoring, the invention overcomes the disadvantages of high monitoring difficulty and inflexibility in the prior art, and improves the monitoring reliability, safety in the monitoring process and high positioning precision.

The technicians in the field should understand that the embodiments of the application may be provided in the form of methods, systems, or computer program products. Therefore, the application may be in the form of a full hardware embodiment, a full software embodiment, or a combination of software and hardware embodiments. Moreover, the application may be in the form of a computer program product implemented on one or more computer available storage media (including but not limited to disk memory, CD-ROM, optical memory, etc.) in which computer available program codes are contained.

The application is described by reference to flow charts and/or block diagrams of methods, equipment (systems), and computer program products based on the embodiments of the application. It should be understood that each process and/or box in the flowchart and/or block diagram, and a combination of processes and/or boxes in the flowchart and/or block diagram can be implemented by computer program instructions. The computer program instructions may be provided to a general-purpose computer, a special purpose computer, an embedded processor, or a processor of other programmable data processing equipment to generate a machine, so that the instructions executed by the computer processor or other programmable data processing device generate a device used to implement the functions specified in one or more processes of the flowchart and/or one or more boxes of the block diagram.

The technicians in the field should understand that the embodiments of the application may be provided in the form of methods, systems, or computer program products. Therefore, the application may be in the form of a full hardware embodiment, a full software embodiment, or a combination of software and hardware embodiments. Moreover, the application may be in the form of computer program products implemented on one or more computer available storage media (including but not limited to disk memory, CD-ROM, optical memory, etc.) in which computer available program codes are contained.

The computer program instructions may also be loaded onto the computer or other programmable data processing devices, so that a series of operational steps are performed on the computer or other programmable data processing devices generate computer-implemented processing, and therefore the instructions executed on the computer or other programmable data processing devices provide steps for implementing the functions specified in one or more processes of the flowchart and/or one or more boxes of the block diagram.

Finally, it should be noted that the above embodiments are used only to describe the technical proposal of the invention and not to limit it. Although the invention is described in detail by reference to the above embodiments, ordinary technicians in the field should understand that the embodiments of the invention may still be modified or equivalently substituted, and any modification or equivalent substitution that does not depart from the spirit and scope of the invention should be covered by the claims of the invention.

The invention claimed is:

1. A digital speckle based online water wall stress monitoring method, characterized by including the following steps:

Arrange an online stress monitoring device on the side of the water wall to be monitored;

Determine a plurality of monitoring points according to the area of the water wall, and set the motion track of the online stress monitoring device for speckle image acquisition according to the determined monitoring points;

Acquire the real-time speckle image of each monitoring point in real time after acquiring the initial speckle image of each monitoring point;

Compare the real-time speckle images with the initial speckle images, and determine whether the stress of the water wall changes according to the comparison results;

wherein the digital speckle based online water wall stress monitoring method further comprises the following steps when determining a plurality of monitoring points according to the area of the water wall and setting the motion track of the online stress monitoring device for speckle image acquisition according to the determined monitoring points:

Determine the surface area S0 of the water wall;

Preset the first preset area S1, the second preset area S2, the third preset area S3 and the fourth preset area S4, and $S1<S2<S3<S4$; preset the number Q1 of first preset monitoring points, the number Q2 of second preset monitoring points, the number Q3 of third preset monitoring points and the number Q4 of fourth preset monitoring point, and $Q1<Q2<Q3<Q4$;

Set the number of monitoring points according to the relationship between the surface area S0 and each preset area:

When $S0<S1$, select the number Q1 of first preset monitoring points as the number of monitoring points;

When $S1≤S0<S2$, select the number Q2 of first preset monitoring points as the number of monitoring points;

When $S2≤S0<S3$, select the number Q3 of first preset monitoring points as the number of monitoring points;

When $S3≤S0<S4$, select the number Q4 of first preset monitoring points as the number of monitoring points;

After selecting the number Qi of preset monitoring points i as the number of monitoring points, and $i=1,2,3,4$, connect Qi monitoring points in series as the motion track of the online stress monitoring device in order to enable the online stress monitoring device to acquire the speckle images of each monitoring point in the motion track in turn.

2. The digital speckle based online water wall stress monitoring method according to claim 1, characterized by including the following steps when acquiring the initial speckle image of each monitoring point:

Debug a blue light of the online stress monitoring device until the blue light projects clear speckles on the wall surface of the water wall to be monitored;

Acquire the speckle image of each monitoring point according to the set shooting parameters.

3. The digital speckle based online water wall stress monitoring method according to claim 1, characterized by including the following steps when comparing the real-time speckle images with the initial speckle images and determining whether the stress of the water wall changes according to the comparison results:

Acquire the initial speckle images of Qi monitoring points respectively, and mark a plurality of initial feature points in the initial speckle images of each monitoring point;

Acquire the real-time speckle images of Qi monitoring points respectively, and mark a plurality of initial feature points in the real-time speckle images of each monitoring point;

Compare the real-time feature points with the initial feature points, and determine whether the stress of the water wall changes according to the displacement between the real-time feature points and the initial feature points.

4. The digital speckle based online water wall stress monitoring method according to claim 3, characterized by including the following steps when comparing the real-time feature points with the initial feature points and determining whether the stress of the water wall changes according to the displacement between the real-time feature points and the initial feature points:

Preset the first preset displacement K1, the second preset displacement K2, the third preset displacement K3 and the fourth preset displacement K4, and $K1<K2<K3<K4$; preset the first preset interval time T1, the second preset interval time T2, the third preset interval time T3 and the fourth preset interval time T4, and $T1>T2>T3>T4$;

Acquire the displacement between the real-time feature points and the initial feature points collected each time, determine the monitoring point with the maximum displacement among the monitoring points, and denote the displacement of the monitoring point as the maximum displacement K0;

Determine the interval time for acquiring two adjacent real-time speckle images of each monitoring point according to the relationship between the maximum displacement K0 and each preset displacement:

When K0<K1, select the first preset interval time T1 as the interval time for acquiring two adjacent real-time speckle images of each monitoring point;

When K1≤K0<K2, select the second preset interval time T2 as the interval time for acquiring two adjacent real-time speckle images of each monitoring point;

When K1≤K0<K2, select the second preset interval time T2 as the interval time for acquiring two adjacent real-time speckle images of each monitoring point;

When K2≤K0<K3, select the third preset interval time T3 as the interval time for acquiring two adjacent real-time speckle images of each monitoring point;

When K3≤K0<K4, select the fourth preset interval time T4 as the interval time for acquiring two adjacent real-time speckle images of each monitoring point;

When selecting the $i^{th}$ preset interval time Ti as the interval time for acquiring two adjacent real-time speckle images of each monitoring point, and i=1,2,3,4, acquire the real-time speckle images of the monitoring points every $i^{th}$ preset interval time Ti.

5. The digital speckle based online water wall stress monitoring method according to claim 4, characterized by including the following steps when selecting the $i^{th}$ preset interval time Ti as the interval time for acquiring two adjacent real-time speckle images of each monitoring point:

Obtain the initial average gray value L0 of the initial speckle image and the real-time average gray value ΔL of the real-time speckle image of the monitoring point with the maximum displacement acquired each time;

Preset the first preset gray difference L1, the second preset gray difference L2, the third preset gray difference L3 and the fourth preset gray difference L4, and L1<L2<L3<L4; preset the first preset duration correction coefficient a1, the second preset duration correction coefficient a2, the third preset duration correction coefficient a3 and the fourth preset duration correction coefficient a4, and 1>a1>a2>a3>a4>0.8;

Correct the interval time for acquiring the two adjacent real-time speckle images according to the relationship between the difference between the real-time average gray value ΔL obtained each time and the initial average gray value L0 and the preset gray difference:

When |ΔL−L0|<L1, select the first preset duration correction coefficient a1 to correct the interval time for acquiring two adjacent real-time speckle images, and the corrected interval time is Ti*a1;

When L1≤|ΔL−L0|<L2, select the second preset duration correction coefficient a2 to correct the interval time for acquiring two adjacent real-time speckle images, and the corrected interval time is Ti*a2;

When L2≤|ΔL−L0|<L3, select the third preset duration correction coefficient a3 to correct the interval time for acquiring two adjacent real-time speckle images, and the corrected interval time is Ti*a3;

When L3≤|ΔL−L0|<L4, select the fourth preset duration correction coefficient a4 to correct the interval time for acquiring two adjacent real-time speckle images, and the corrected interval time is Ti*a4.

6. A digital speckle based online water wall stress monitoring device, characterized in that the device is used to implement the digital speckle based online water wall stress monitoring method in claim 1, comprising:

A stress monitoring unit, which is arranged on the side of the water wall and is used to acquire the speckle images of the water wall;

An image processing unit, which is electrically connected with the stress monitoring unit and is used for processing the speckle images;

A data terminal, which is electrically connected with the stress monitoring unit and the image processing unit and is used for data processing and controlling the motion track of the stress monitoring unit.

7. The digital speckle based online water wall stress monitoring device according to claim 6, characterized in that the stress monitoring unit comprises:

A fixed frame;

A load bearing frame arranged inside the fixed frame, connected with the fixed frame in a sliding way and sliding along the fixed frame direction;

A movable speckle transceiver platform fixed inside the load bearing frame and used for acquiring the speckle images of the water wall;

A traction motor arranged on the upper part of the fixed frame, connected with the load bearing frame and used for driving the load bearing frame to move inside the fixed frame.

8. The digital speckle based online water wall stress monitoring device according to claim 7, characterized in that the stress monitoring unit also comprises:

A counterweight device arranged on the side of the fixed frame in a sliding way;

A guide wheel arranged on the upper part of the fixed frame and side by side with the traction motor;

A steel wire rope, which is arranged on a guide wheel and connected with the traction motor, and two ends of which are respectively connected with the counterweight device and the load bearing frame.

9. The digital speckle based online water wall stress monitoring device according to claim 7, characterized in that the movable speckle transceiver platform comprises a ball screw, a guide rail, a digital camera, a blue light, a deadweight sliding block and a motor, wherein The deadweight sliding block, the motor and the ball screw are installed on the guide rail, the motor is connected with the ball screw to drive the ball screw to make rotational motion and therefore drive a nut fixed in the deadweight sliding block to make linear to-and-fro movement, and the digital camera and the blue light are arranged on the deadweight sliding block.

* * * * *